(12) United States Patent
Matsunaga et al.

(10) Patent No.: US 11,104,355 B2
(45) Date of Patent: Aug. 31, 2021

(54) PARKING SUPPORT APPARATUS (71) Applicant: TOYOTA JIDOSHA KABUSHIKI KAISHA, Toyota (JP)

(72) Inventors: Yasutaka Matsunaga, Nisshin (JP); Yuki Minase, Toyota (JP); Miyuki Omori, Nagoya (JP); Toshihiro Takagi, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/066,131

(22) Filed: Oct. 8, 2020

(65) Prior Publication Data

US 2021/0107507 A1 Apr. 15, 2021

(30) Foreign Application Priority Data

Oct. 11, 2019 (JP) .............................. JP2019-187515

(51) Int. Cl.
*B60Q 1/48* (2006.01)
*B60W 50/14* (2020.01)
*B60W 30/06* (2006.01)
*B60W 40/08* (2012.01)

(52) U.S. Cl.
CPC ............ *B60W 50/14* (2013.01); *B60W 30/06* (2013.01); *B60W 40/08* (2013.01); *B60W 2050/143* (2013.01); *B60W 2050/146* (2013.01); *B60W 2540/12* (2013.01)

(58) Field of Classification Search
CPC ...... B60W 50/14; B60W 30/06; B60W 40/08; B60W 2050/143; B60W 2050/146; B60W 2540/12

USPC ....................................................... 340/932.2
See application file for complete search history.

(56) References Cited

U.S. PATENT DOCUMENTS

| 2009/0111654 | A1* | 4/2009 | Hecht | ................... | F16H 63/483 |
| | | | | | 477/195 |
| 2013/0151097 | A1* | 6/2013 | Deurloo | .............. | F16H 61/0204 |
| | | | | | 701/62 |
| 2013/0191189 | A1* | 7/2013 | Aparicio | ................ | G07B 15/02 |
| | | | | | 705/13 |

(Continued)

FOREIGN PATENT DOCUMENTS

| JP | 2014-069645 A | 4/2014 |
| JP | 2015-003565 A | 1/2015 |

(Continued)

*Primary Examiner* — Naomi J Small
(74) *Attorney, Agent, or Firm* — Sughrue Mion, PLLC (57) ABSTRACT

A parking support apparatus determines whether or not a leaving condition becomes satisfied while the controller is executing the automatic parking control and the current shift range is at range other than a parking range, the leaving condition being a condition that is satisfied when the driver performs a leaving action. The parking support apparatus determines whether or not the vehicle has already reached the target parking area. The parking support apparatus generates a first alert having a first alerting capability, if the vehicle has already reached the target parking area when the leaving condition has been satisfied, and generates a second alert having a second alerting capability lower than the first alerting capability or no alerts, if the vehicle has not reached the target parking area yet when the leaving condition has been satisfied.

4 Claims, 7 Drawing Sheets

| DRIVER'S ACTIONS<br>C1: ACTION OF UNFATSENING SEAT BELT<br>C2: ACTION OF OPENING DOOR | VEHICLE STATE | |
|---|---|---|
| | LEAVING POSSIBILITY: MIDIUM<br>ALERTING CAPABILITY 2 | LEAVING POSSIBILITY: LOW<br>ALERTING CAPABILITY 1 |
| DRIVER PERFORMS ONE OF C1 AND C2. | LEAVING POSSIBILITY: MIDIUM<br>ALERTING CAPABILITY 2 | LEAVING POSSIBILITY: LOW<br>ALERTING CAPABILITY 1 |
| DRIVER PERFORMS BOTH OF C1 AND C2, AND STEPS ON BRAKE PEDAL. | LEAVING POSSIBILITY: MIDIUM<br>ALERTING CAPABILITY 2 | |
| DRIVER PERFORMS BOTH OF C1 AND C2, AND RELEASES BRAKE PEDAL. | LEAVING POSSIBILITY: HIGH<br>ALERTING CAPABILITY 3 | |

(56) References Cited

U.S. PATENT DOCUMENTS

| | | | |
|---|---|---|---|
| 2015/0367845 A1 | 12/2015 | Sannodo et al. | |
| 2016/0114795 A1 | 4/2016 | Kiyokawa et al. | |
| 2016/0358474 A1* | 12/2016 | Uppal | G06K 9/00812 |
| 2019/0293171 A1* | 9/2019 | Cuddihy | F16H 63/48 |
| 2020/0217414 A1* | 7/2020 | Nakade | F16H 63/48 |
| 2020/0398824 A1* | 12/2020 | Tsujino | B60W 10/18 |

FOREIGN PATENT DOCUMENTS

| | | |
|---|---|---|
| JP | 2016-002957 A | 1/2016 |
| JP | 2016-084094 A | 5/2016 |
| JP | 2018-069910 A | 5/2018 |
| JP | 2019-032744 A | 2/2019 |

\* cited by examiner

| DRIVER'S ACTIONS<br>C1: ACTION OF UNFATSENING<br>SEAT BELT<br>C2: ACTION OF OPENING DOOR | VEHICLE STATE | |
|---|---|---|
| | LEAVING POSSIBILITY:<br>MIDIUM<br>ALERTING CAPABILITY 2 | LEAVING POSSIBILITY:<br>LOW<br>ALERTING CAPABILITY 1 |
| DRIVER PERFORMS ONE OF C1<br>AND C2. | LEAVING POSSIBILITY:<br>MIDIUM<br>ALERTING CAPABILITY 2 | LEAVING POSSIBILITY:<br>LOW<br>ALERTING CAPABILITY 1 |
| DRIVER PERFORMS BOTH OF C1<br>AND C2, AND STEPS ON BRAKE<br>PEDAL. | LEAVING POSSIBILITY: MIDIUM<br>ALERTING CAPABILITY 2 | |
| DRIVER PERFORMS BOTH OF C1<br>AND C2, AND RELEASES BRAKE<br>PEDAL. | LEAVING POSSIBILITY: HIGH<br>ALERTING CAPABILITY 3 | |

| CAPABILITY | CAPABILITY 1 | CAPABILITY 2 | CAPABILITY 2 |
|---|---|---|---|
| DISPLAY | | | |
| BUZZER | PON | PI PI PI PI PI PI INTERMITTENT SOUND | PIIIIIII CONTINUOUS SOUND |
| VOICE MESSAGE | "PLEASE SWITCH SHIFT POSITION TO PARKING." (SINGLE TIME) | "PLEASE SWITCH SHIFT POSITION TO PARKING." (REPEAT) | "PLEASE SWITCH SHIFT POSITION TO PARKING." (REPEAT) |
| HORN | NONE | NONE | BI BI BI ... BI BI BI ... INTERMITTENT SOUND × 3TIMES+STOP |

PARKING SUPPORT APPARATUS

TECHNICAL FIELD

The present disclosure relates to a parking support/assist apparatus configured to execute an automatic parking control for having a vehicle travel/move to a target parking area designated by a driver. Especially, the present disclosure relates to the parking support apparatus configured to generate an alert when the driver is about get out of the vehicle in a case where a current shift range is not at a parking range.

BACKGROUND

There have been known alert apparatuses of a vehicle configured to generate an alert (or alert the driver) when the driver is about to get out of the vehicle. One of the alert apparatuses of this type (hereinafter, referred to as a "conventional apparatus") is disclosed in, for example, Japanese Patent Application Laid-Open (kokai) No. 2018-69910.

The conventional device determines whether or not a current shift range is at a forward/drive range when the driver shows one of potential behaviors for getting out of the vehicle, in a case where an engine of the hybrid vehicle stops automatically. The potential behaviors for getting out of the vehicle may include an action of opening a driving seat door, An action of unfastening a driver seat belt, and an action of stop sitting on a driving seat. The conventional apparatus generates a first alert having a first alerting capability when the current shift range is at the forward range, as the alert when the driver seems to be about to get out of the vehicle in the above case. The conventional apparatus generates a second alert having a second alerting capability when the current shift range is not at the forward range, as the alert when the driver seems to be about to get out of the vehicle in the above case. The first alerting capability is higher than the second alerting capability.

SUMMARY

While the automatic parking control is being executed, the driver sometimes unfastens the driver seat belt while remaining in the driving seat to turn around to look at a rear area of the vehicle. Similarly, in the above case, the driver may open the driving seat door while remaining in the driving seat to look at a side area and/or the rear area of the vehicle. If the conventional apparatus is applied to the vehicle configured to execute the automatic parking control, the conventional apparatus generates an alert, when the driver shows one of the potential behaviors for getting out of the vehicle without the driver's intention to get out of the vehicle. The alert may annoy the driver.

Meanwhile, during the automatic parking control, it is preferable that the alert be certainly issued if the driver is about to get out of the vehicle when the shift range is not at the parking range.

The present disclosure is made to cope with the problems described above. One of objectives of the present disclosure is to provide a parking support apparatus that is capable of surely generating the alert, while the automatic parking control is being executed, when the driver is about to get out of the vehicle in the case where the current shift range is not at the parking range, and is capable of generating an alert that can reduce a possibility that the alert annoys the driver when the driver performs some actions when the driver does not intend to leave the vehicle.

A parking support apparatus of a vehicle (hereinafter, referred sometimes to as a "present disclosed apparatus") comprises:

a shift range detection sensor (62) configured to detect a current shift range;

an alert output device (70, 71, 72, 75, 80) configured to generate an alert for drawing attention of a driver of a vehicle; and a controller (20, 30, 31, 40 43, 50, 52) configured to execute an automatic parking control for having the vehicle move into a target parking area that the driver designates.

The controller is configured to:

determine whether or not a leaving condition becomes satisfied (Step 535) while the controller is executing the automatic parking control ("Yes" at Step 505) and the current shift range is at a range other than a parking range ("No" at Step 510), the leaving condition being a condition that is satisfied when the driver performs a leaving action that the driver needs to perform in order to get out of the vehicle;

determine whether or not the vehicle has already reached the target parking area (Step 540);

generate, from the alert output device, a first alert having a first alerting capability (Step 530), if it is determined that the vehicle has already reached the target parking area ("Yes" at Step 540) when it is determined that the leaving condition has been satisfied ("Yes" at Step 535); and generate, from the alert output device, a second alert having a second alerting capability or no alert (Step 545), if it is determined that the vehicle has not reached the target parking area yet ("No" at Step 540) when it is determined that the leaving condition has been satisfied ("Yes" at Step 535), the second alerting capability being lower than the first alerting capability in terms of ability to draw attention of the driver.

The driver sometimes performs some actions to watch (look at) an area around the vehicle when the vehicle has not reached the target parking area yet. That actions may be common to actions that the driver performs in order to get out of (leave) the vehicle. In other words, it is more likely the driver performs the leaving action in order to watch the area around the vehicle when the vehicle has not reached the target parking area yet as compared to when the vehicle has already reached the target parking area. In view of the above, the present disclosed apparatus can reduce a possibility that the alert having a high alerting capability is generated when the driver performs the leaving action without the driver's intention to get out of the vehicle. Therefore, the present disclosed apparatus can reduce the possibility that the alert annoys the driver.

In some embodiments, the controller is configured to determine that the leaving condition becomes satisfied when the driver performs one of a first leaving action and a second leaving action ("Yes" at Step 535), and to determine whether or not the vehicle has already reached the target parking area (Step 540) when the leaving condition is determined to become satisfied.

A leaving possibility (a possibility that the driver actually tries to leave the vehicle) of when the driver has performed only one of leaving actions (the first leaving action and the second leaving action) is lower than the leaving possibility of when the driver has performed both of the leaving actions. When the leaving action has been performed but the leaving possibility is not so high, the present disclosed apparatus according to this embodiment generates the alert that is selected/varied depending on whether or not the vehicle has already reached. Therefore, this present disclosed apparatus can generate the alert that appropriately corresponds to the leaving possibility, because the leaving possibility varies depending on whether or not the vehicle has already reached.

In some embodiments, the controller is configured to generate, from the alert output device, an alert having a third alerting capability (Step 525, Step 530) regardless of whether or not the vehicle has already reached the target parking area, when it is determined that the driver has performed both of the first leaving action and the second leaving action ("Yes" at Step 515), the third alerting capability being equal to or higher than the first alerting capability in terms of ability to draw attention of the driver.

The leaving possibility of when the driver has performed both of the leaving actions is high (or is higher than that of when the driver has performed only one of the leaving actions). Thus, when it is determined that the driver has performed both of the leaving actions, the present disclosed apparatus according to this embodiment generates the alert having the third alerting capability equal to or higher than the first alerting capability in terms of ability to draw attention of the driver. Therefore, this present disclosed apparatus can cause the driver to notice that the shift range is not at the parking range, with high possibility.

In some embodiments, the controller is configured to:
determine whether or not the driver has performed a quasi leaving action (Step 520), wherein a possibility that the driver gets out of the vehicle when the driver has performed the quasi leaving action is lower than a possibility that the driver gets out of the vehicle when the driver has performed both of the first leaving action and the second leaving action ("Yes" at Step 515);
generate, from the alert output device, an alert having an alerting capability higher than the first alerting capability in terms of ability to draw attention of the driver (Step 525), when it is determined that the driver has performed the quasi leaving action ("Yes" at Step 520) in a case where the driver has performed both of the first leaving action and the second leaving action; and
generate, from the alert output device, an alert having an alerting capability equal to the first alerting capability in terms of ability to draw attention of the driver (Step 530), when it is determined that the driver has not performed the quasi leaving action ("No" at Step 520) in the case where the driver has performed both of the first leaving action and the second leaving action.

A possibility that the driver gets out of the vehicle while the shift range remains at one of ranges other than the parking range, when the driver has performed all of the first leaving action, the second leaving action, and the quasi leaving action is very high. In that case, the present disclosure apparatus according to this embodiment generates the alert having the higher alerting capability. Therefore, this present disclosed apparatus can reduce the possibility that the driver gets out of the vehicle while the shift range remains at one of ranges other than the parking range.

Notably, in the above description, in order to facilitate understanding of the present disclosure, the constituent elements or the like of the disclosure corresponding to those of the embodiments of the disclosure that will be described later are accompanied by parenthesized names and/or symbols that are used in the embodiments. However, the constituent elements of the disclosure are not limited to those in the embodiments defined by the names and/or the symbols. Other objects, other features, and attendant advantages of the present disclosure will be readily appreciated from the following description of the embodiments of the disclosure that is made with reference to the accompanying drawings.

DETAILED DESCRIPTION

"A parking support (or assist) apparatus 10 for a vehicle" according to an embodiment of the present disclosure will be described with reference to the drawings. Hereinafter, the parking support apparatus 10 is referred to as "the present support apparatus 10".

(Configuration)

Figure 1:
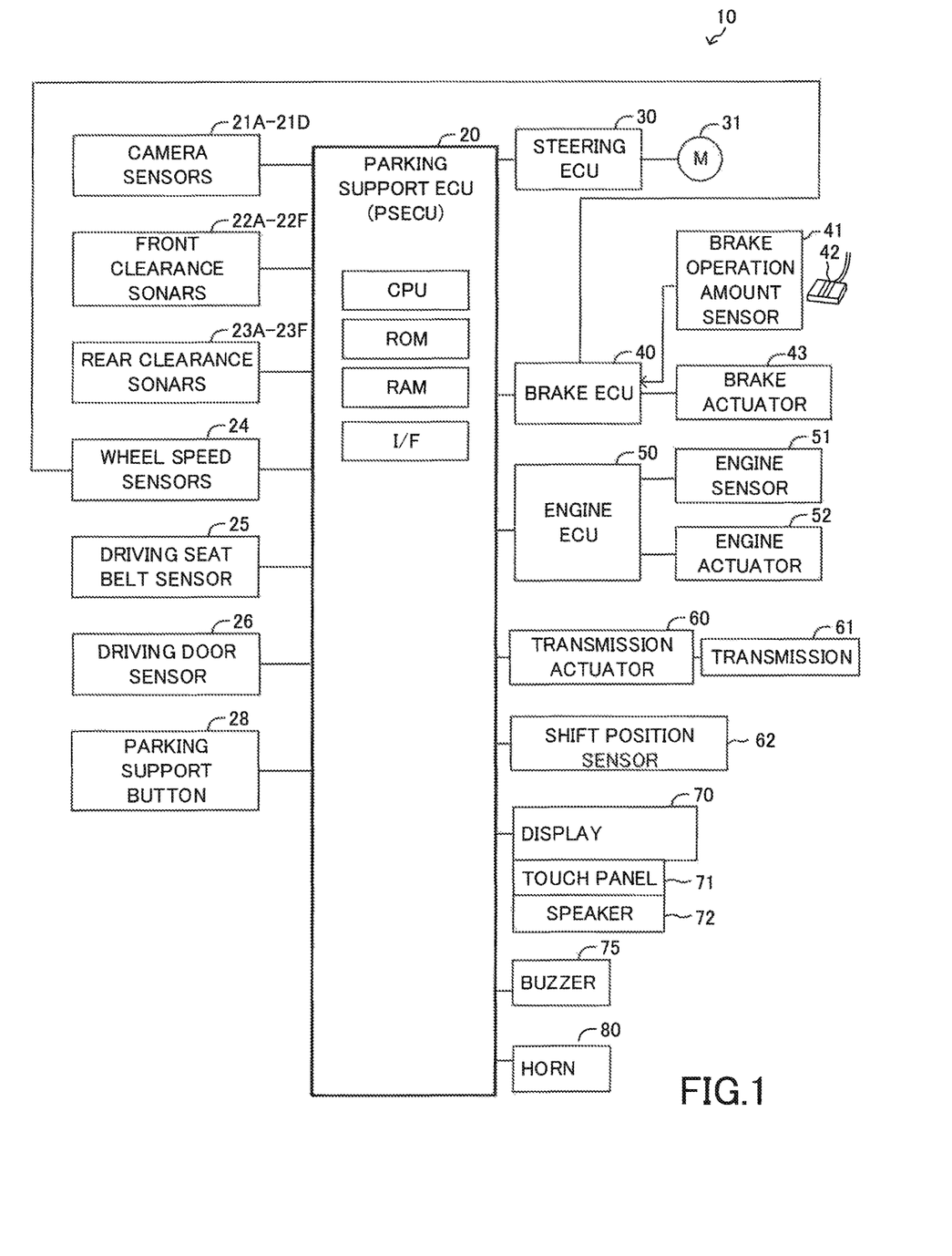
FIG. 1 is a schematic diagram of a parking support apparatus (the present support device) of a vehicle according to an embodiment of the present disclosure.
Figure 2:
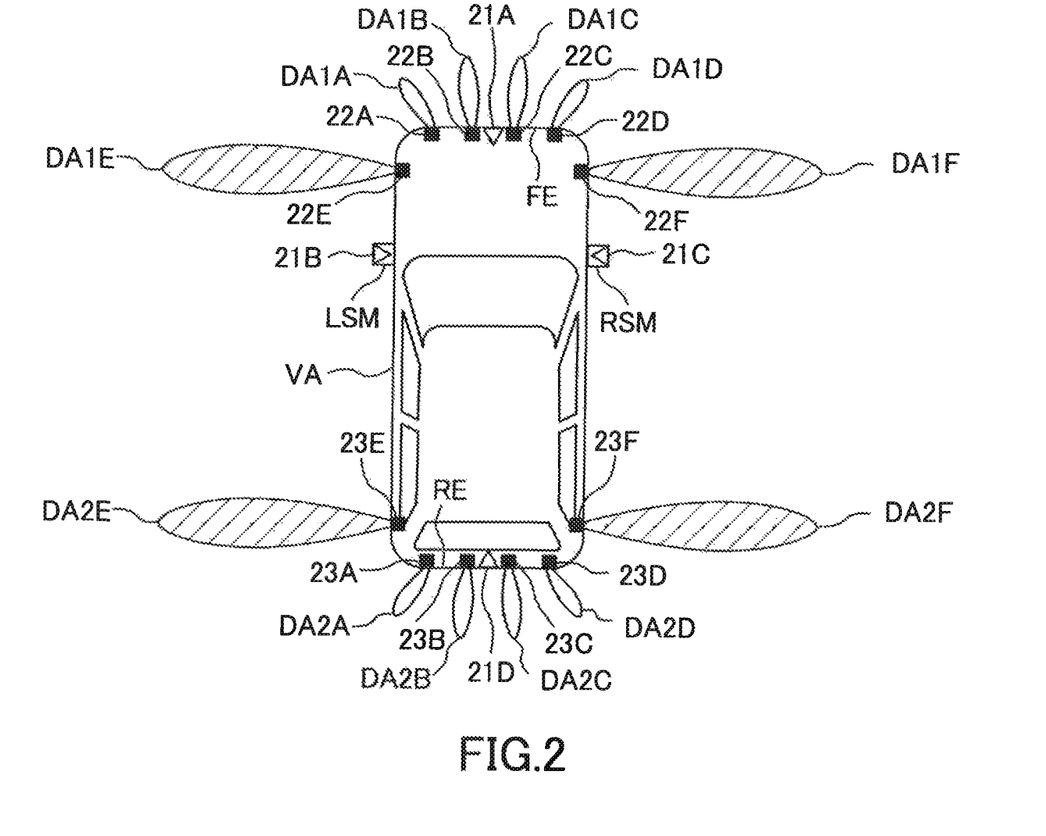
FIG. 2 is a plan view of the vehicle for illustrating positions of camera sensors, front clearance sonars, and rear clearance sonars, and for illustrating detection ranges of the front clearance sonars and the rear clearance sonars.

The present support apparatus 10 is applied to a vehicle VA (referring to FIG. 2). As shown in FIG. 1, the present support apparatus 10 comprises a parking support ECU 20, a steering ECU 30, a brake ECU 40, and an engine ECU 50. The parking support ECU 20 is referred to as a "PSECU 20". The above ECUs are connected to each other via a communication/sensor system controller area network (CAN) (not shown) to be able to mutually transmit and receive information to/from those ECUs.

An "ECU" is an abbreviation of an Electronic Control Unit. Each of those ECUs comprises a microcomputer as a main component. The microcomputer includes a CPU, a ROM, a RAM, a nonvolatile memory, and an interface I/F. The CPU achieves various functions through executing instructions/programs/routines stored in the ROM. Some or all of those ECUs may be integrated into a single ECU.

The present support apparatus 10 comprises four camera sensors 21A to 21D, six front clearance sonars 22A to 22F, six rear clearance sonars 23A to 23F, wheel speed sensors 24, a driver seat belt sensor 25, a driver door sensor 26, and a parking support button 28. These sensors (21A to 21D, 22A to 22F, 23A to 23F, 24, 25, 26) and button 28 are electrically connected to the PSECU 20. [0022]

The camera sensors 21A to 21F are referred to as "camera sensors 21" when they do not need to be distinguished from each other. The front clearance sonars 22A to 22F are referred to as "front clearance sonars 22" when they do not need to be distinguished from each other. The rear clearance sonars 23A to 23F are referred to as "rear clearance sonars 23" when they do not need to be distinguished from each other. The front clearance sonars 22 and the rear clearance sonars 23 are referred to as "clearance sonars" when they do not need to be distinguished from each other.

As shown in FIG. 2, the camera sensor 21A is fixed to the center of a front end portion (a front bumper) FE of the vehicle VA in a vehicle width direction so as to photograph (or capture/take an image of) a scene in front of the vehicle VA every time a predetermined time elapses. The camera sensor 21B is fixed to a left side mirror LSM on the left of the vehicle VA so as to photograph (or capture/take an image of) a scene on the left of the vehicle VA every time a predetermined time elapses. The camera sensor 21C is fixed to a right side mirror RSM on the right of the vehicle VA so as to photograph (or capture/take an image of) a scene on the right of the vehicle VA every time a predetermined time elapses. The camera sensor 21D is fixed to the center of a rear end portion RE of the vehicle VA in the vehicle width direction so as to photograph (or capture/take an image of) a scene behind the vehicle VA every time a predetermined time elapses. In the present specification, photographing the scene has the same meaning as generating image data about the scene.

Each of the clearance sonars radiates ultrasonic wave to a detection area. If an object is present in the detection area, the object reflects the ultrasonic wave. The clearance sonar that radiated the ultrasonic wave receives the ultrasonic wave that is reflected from the object so as to detect the object. Each of the clearance sonars transmits, to the PSECU 20, object information including a time (a radiation-reception time) from a radiation time point to a reception time point. The radiation time point is a time point at which each of the clearance sonars radiates the ultrasonic wave. The reception time point is a time point at which each of the clearance sonars receives the ultrasonic wave. The PSECU 20 is configured to obtain a distance between the object and each of the clearance sonars based on the radiation-reception time, and to specify/obtain a position of the object with respect to the vehicle VA using "a direction of the detection area of the clearance sonar that transmits the object information" and the obtained distance.

The front clearance sonars 22A to 22D are fixed at equal intervals in the front end portion FE of the vehicle VA in the vehicle width direction. The front clearance sonars 22A to 22D detect objects in detection areas DA1A to DA1D respectively. Each of the detection areas DA1D to DA1D is formed into an elliptical shape that extends to a front direction of the vehicle VA. The front clearance sonars 22E is fixed on a front left side of the vehicle VA. The front clearance sonar 22E detects an object that presents in a detection area DA1E. The detection area DA1E is formed into an elliptical shape that extends to a left direction from the front clearance sonar 22E. The front clearance sonar 22F is fixed on a front right side of the vehicle VA. The front clearance sonar 22F detects an object that presents in a detection area DA1F. The detection area DA1F is formed into an elliptical shape that extends to a right direction from the front clearance sonar 22F.

The rear clearance sonars 23A to 23D are fixed at equal intervals in the rear end portion RE of the vehicle VA in the vehicle width direction. The rear clearance sonars 23A to 23D detect objects in detection areas DA2A to DA2D respectively. Each of the detection areas DA2D to DA2D is formed into an elliptical shape that extends to a rear direction of the vehicle VA. The rear clearance sonars 23E is fixed on a rear left side of the vehicle VA. The rear clearance sonar 23E detects an object that presents in a detection area DA2E. The detection area DA2E is formed into an elliptical shape that extends to the left direction from the rear clearance sonar 23E. The rear clearance sonar 23F is fixed on a rear right side of the vehicle VA. The rear clearance sonar 23F detects an object that presents in a detection area DA2F. The detection area DA2F is formed into an elliptical shape that extends to the right direction from the rear clearance sonar 23F.

A maximum distance that the ultrasonic wave radiated by each of the clearance sonars 22E to 22F and 23E to 23F is longer than a maximum distance that the ultrasonic wave radiated by each of the clearance sonars 22A to 22D and 23A to 23D. A distance that each of the clearance sonars 22E to 22F and 23E-23F can detect the object that present in the right side area or the left side area of the vehicle VA is longer than a distance that each of the clearance sonars 22A to 22D and 23A to 23D can detect the object in the front area or the rear area of the vehicle VA.

Referring back to FIG. 1, the sensors 24 and 25 will be described below.

Each of the wheel speed sensors 24 generates one pulse signal when the corresponding one wheel rotates by a predetermined angle. The PSECU 20 specifies/obtains a vehicle speed Vs based on the pulse signals.

The driver seat belt sensor 25 detects a fastened/unfastened state of the driver seat belt, and transmits a detection signal indicative of the fastened/unfastened state. The fastened/unfastened state is indicative of whether or not the driver seat belt is fastened. The driver door sensor 26 detects an opened/closed state of a driver door, and transmits a detection signal indicative of the opened/closed state. Namely, the detection signal of the driver door sensor 26 is indictive of whether or not the driver door is opened.

The parking support button 28 is mounted/arranged in the vicinity of a steering wheel (not shown). The driver operates the parking support button 28 when the driver wants the PSECU 20 to execute an automatic parking control.

The steering ECU 30 is a control device for a well-known electric power steering system. The steering ECU 30 is electrically connected to a steering motor 31. The steering motor 31 is embedded in an unillustrated steering mechanism including the steering wheel, a steering shaft electrically connected to the steering wheel, a steering gear mechanism. The steering motor 31 generates torque through using electric power that is supplied from a vehicle battery (not shown) installed in the vehicle VA. The direction, magnitude, and the like, of the torque are adjusted by the steering ECU 30. The torque is used to generate a steering assist torque and/or to steer a left steered wheel and a right steered wheel (to change a steered angle of the vehicle VA).

The steering ECU 30 detects steering torque applied by the driver using a steering torque sensor (not shown) to have the steering motor 31 generate the steering assist torque corresponding to the detected steering torque in order to lighten a steering operation by the driver. Furthermore, the steering ECU 30 detects a steered angle of the steering wheel using a steered angle sensor (not shown). When the steering ECU 30 receives a steering instruction including a target steered angle transmitted by the PSECU 20, the steering ECU 30 controls a driving state of the steering motor 31 in such manner that the detected steered angle coincides with the target steered angle included in the steering instruction so as to steer the steered wheel.

The brake ECU 40 is electrically connected to a brake pedal operation amount sensor 41, the wheel speed sensors 24, or the like. The brake ECU 40 receives a detection signal from each of those sensors.

The brake pedal operation amount sensor 41 detects an operation amount (a brake pedal operation amount) BP of a brake pedal 42 of the vehicle VA. The brake pedal operation amount BP becomes "0" when the driver performs no operation on the brake pedal 42 (in other words, when the driver releases the brake pedal 42).

The brake ECU 40 is electrically connected to a brake actuator 43. The brake actuator 43 is a hydraulic control actuator. The brake actuator works to apply frictional brake force to the wheel. Normally, the brake ECU 40 drives the brake actuator 43 in such a manner that brake force called operation brake force corresponding to the brake pedal operation amount BP is applied to the wheel. While the PSECU 20 is executing the automatic parking control, the brake ECU 40 drives the brake actuator 43 in such a manner that "brake force corresponding to the operation brake force or required brake force transmitted by the PSECU 20, whichever is larger" is applied to the wheel.

The engine ECU 50 is electrically connected to engine sensors 51, and receives a detection signal from each of the engine sensors 51.

The engine sensors 51 detect various driving state amounts of "a gasoline-fuel injection, spark-ignition-type, and multi-cylinder engine (not shown) that is a driving source of the vehicle VA". The engine sensors 51 include a throttle valve opening degree sensor, an engine rotation speed sensor, an air intake amount sensor. Furthermore, the engine sensors 51 include an acceleration pedal operation amount sensor configured to detect an operation amount AP of an acceleration pedal (not shown).

The engine ECU 50 is electrically connected to engine actuators 52 that include a throttle valve actuator, and a fuel injection actuator. The engine ECU 50 changes torque generated by the internal combustion engine through driving the engine actuator 52 so as to adjust driving force of the vehicle VA. The engine ECU 50 drives the throttle valve actuator in such a manner that an opening degree of a throttle valve coincides with a target throttle valve opening degree. The engine ECU 50 determines the target throttle valve opening degree as an operation target throttle valve opening degree in such a manner that it becomes greater as the acceleration pedal operation amount becomes greater, in a normal driving state. While the PSECU 20 is executing the automatic parking control, the engine ECU 50 drives the engine actuator 52 in such a manner that the opening degree of the throttle valve coincides with a required target throttle valve opening degree transmitted by the PSECU 20 or the operation target throttle valve opening degree, whichever is larger.

The present support apparatus 10 further comprises a transmission actuator 60, a transmission 61, and a shift position sensor 62.

The transmission actuator 60 is electrically connected to the PSECU 20 and the transmission 61. The transmission actuator 60 switches a gear position of the transmission 61 of the vehicle VA. The shift position sensor 62 is electrically connected to the PSECU 20, and outputs, to the PSECU 20, a detection signal indicative of a "shift position SP (i.e., shift range)" that is a position of a shift lever (not shown) operated by the driver. The shift position SP is at one of a forward range, a reverse range, a neutral range, and a parking range. The shift position sensor 62 is referred to as a shift range detection sensor and is configured to transmit the detection signal to the PSECU 20.

The PSECU 20 determines the gear position of the transmission 61 based on the shift position SP, the acceleration pedal operation amount AP, and the vehicle speed Vs. Thereafter, the PSECU 20 transmits a driving signal to the transmission actuator 60, so that the determined gear position is achieved. For example, when the shift position is located at a position of the reverse range "R", the PSECU 20 and the transmission actuator 60 set the gear position of the transmission 61 to a position for making the vehicle VA back/reverse. When the shift position SP is located at a position of the forward range "D", the PSECU 20 and the transmission actuator 60 set the gear position of the transmission 61 to a position for making the vehicle VA move forward. When the shift position SP is located at a position of the parking range "P", the PSECU 20 and the transmission actuator 60 set the gear position of the transmission 61 to a position for prohibit the vehicle VA from moving (for making the vehicle VA continue to stop).

The present support apparatus 10 further comprises a display 70, a buzzer 75, and a horn 80. The display 70 includes a touch-panel (a touch-panel display) 71, and a speaker 72. The display 70 receives display information from the ECUs and a navigation device (not shown) of the vehicle VA to display the received display information on the touch panel 71. When an occupant or the driver touches a screen of the touch panel 71, the display 70 receives/detects an operation input corresponding to a position that he/she touches. The speaker 72 generate a voice message of the navigation device. The buzzer 75 includes a speaker configured to generate alert sounds to inside of a vehicle cabin of the vehicle VA. The horn 80 is configured to generate the alert sounds to outside of the vehicle VA in response to a driver's operation and/or an instruction from the PSECU 20

(Automatic Parking Control)

The automatic parking control will next be described with reference to FIG. 3. In the automatic parking control, the present support apparatus 10 controls acceleration, deceleration, and steering angle of the vehicle VA automatically. However, the driver needs to operate the shift lever to switch the shift range to the appropriate shift range.

The present support apparatus 10 searches for parking areas PA where the vehicle VA can be parked based on the image data obtained by the camera sensors 21A to 21D and the object information obtained by the clearance sonars, when the vehicle speed Vs is equal to or lower than a predetermined threshold speed Vsth. A process/method for searching for the parking areas PA is well-known and disclosed in, for example, Japanese Patent Application Laid-Open (kokai) No. 2015-3565, Japanese Patent Application Laid-Open (kokai) No. 2014-69645, Japanese Patent Application Laid-Open (kokai) No. 2016-2957, and Japanese Patent Application Laid-Open (kokai) No. 2016-84094.

Figure 3:
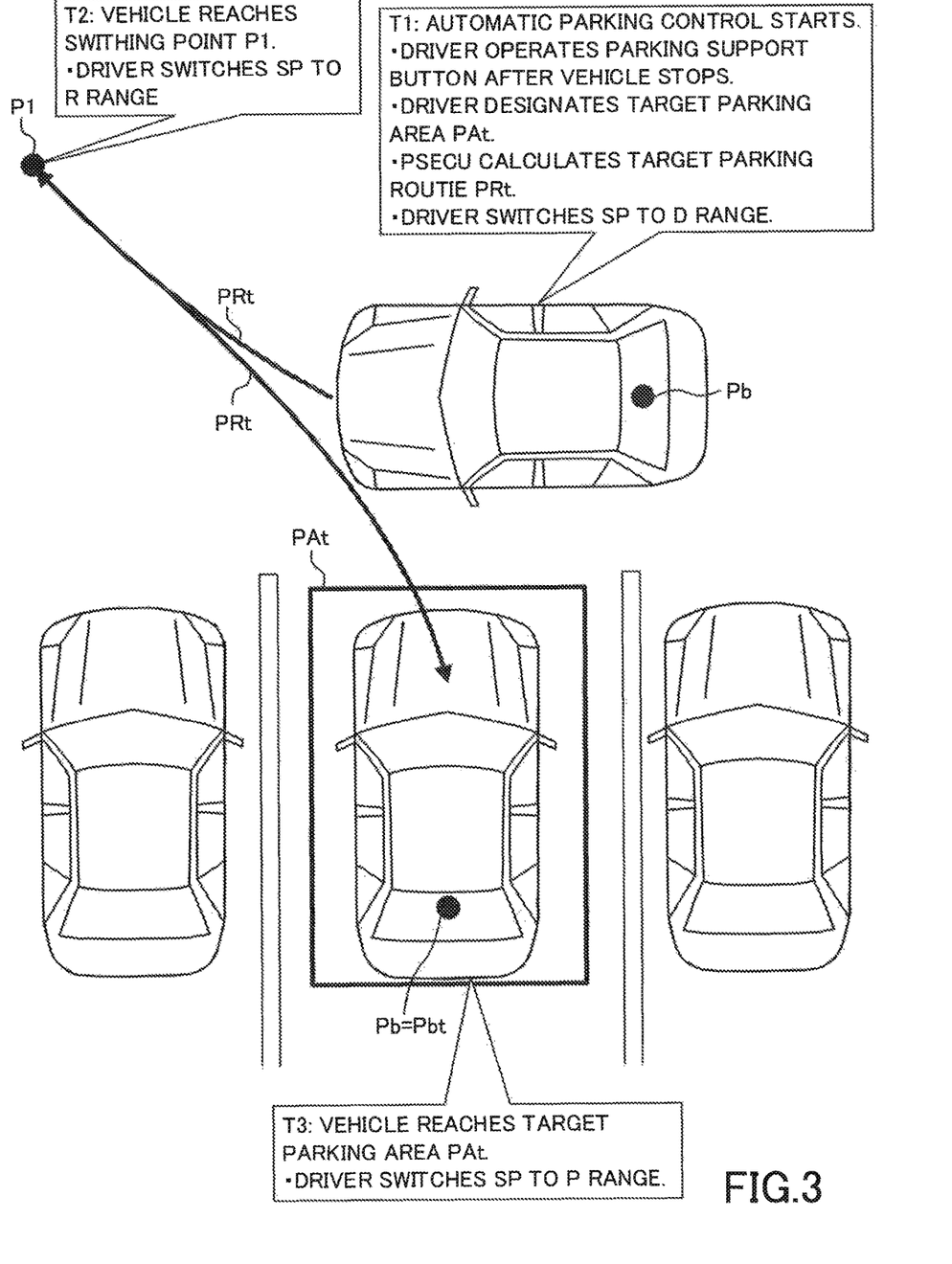
FIG. 3 is a view for illustrating an automatic parking control.

Thereafter, when the parking support button is operated at a time point T1 shown in FIG. 3 in the case where the vehicle VA stops, the present support apparatus 10 displays a target parking area designation screen (not shown) on the touch panel 71. On the target parking area designation screen, the positions of the searched parking areas PA with respect to the vehicle are displayed. Furthermore, the target parking area designation screen is a screen configured to be able to receive/detect a designation of a target parking area PAt among the displayed parking areas PA. The target parking area PAt is the parking area PA at which the vehicle VA is planned to be parked though the automatic parking control. The driver designates the target parking area PAt by touching a position on the target parking area designation screen, the position corresponding to one of the parking areas PA that the driver intend to designate as the target parking area PAt. In the example shown in FIG. 3, the area PAt is designated as the target parking area PAt. Therefore, a perpendicular parking is needed for the vehicle to be parked to the target parking area PAt. When the perpendicular parking is performed, a front-rear direction of the vehicle VA observed when the perpendicular parking is finished intersects with the front-rear direction of the vehicle VA observed at the time point T1.

After the target parking area PAt is designated, the present support apparatus 10 calculates a target parking route (path) PRt. The target parking route PRt is a route along which the vehicle VA is moved so as to be parked at the target parking area PAt from the position of the vehicle VA at the time point T1. A process/method for calculating the target parking route PRt is well-known and is disclosed in, for example, Japanese Patent Application Laid-Open (kokai) No. 2015-3565, and Japanese Patent Application Laid-Open (kokai) No. 2016-84094. In the example shown in FIG. 3, the vehicle VA moves forward while turning right from the position of the vehicle VA at the time point T1 up to a switching point P1, and thereafter, the vehicle VA backs (moves backward) while turning left from the switching point P1 to the target parking area PAt, along the target parking route PRt indicated by a thick line.

After the present support apparatus 10 calculates the target parking route PRt, the present support apparatus 10 displays, on the touch panel 71, a message to prompt the driver to switch a range (the shift range) of the shift position SP to the forward range "D". When the driver has operated the shift lever so as to set the shift range to the forward range "D", the vehicle VA starts forwarding along the target parking route PRt. The PSECU 20 transmits the steering instruction including an appropriate target steered angle to the steering ECU 30, transmits a driving instruction including an appropriate target throttle valve opening degree to the engine ECU 50, and transmits a braking instruction including an appropriate required braking force to the brake ECU 40, so that the vehicle VA moves along the target parking route PRt.

The vehicle VA reaches the switching point P1 at a time point T2. More specifically, a vehicle reference position Pb that is positioned at the center between a left rear wheel and a right rear wheel of the vehicle VA reaches the switching point P1 at the time point T2. At the time point T2, the present support apparatus 10 starts displaying, on the touch panel 71, a message to prompt the driver to switch the shift range to the reverse range "R". When the driver has operated the shift lever so that the shift range is moved to the reverse range "R", the vehicle VA starts moving backward (backing) along the target parking route PRt.

The vehicle VA reaches the target parking area PAt at a time point T3. More specifically, the vehicle reference point Pb reaches a target reference point Pbt of the target parking area PAt at the time point T3. At the time point T3, the present support apparatus 10 starts displaying, on the touch panel 71 a message to prompt the driver to switch the shift range to the parking range "P". When the driver has operated the shift lever so that the shift range is moved to the parking range "P", the vehicle VA ends the automatic parking control.

(Outline of operation)

Figure 4:
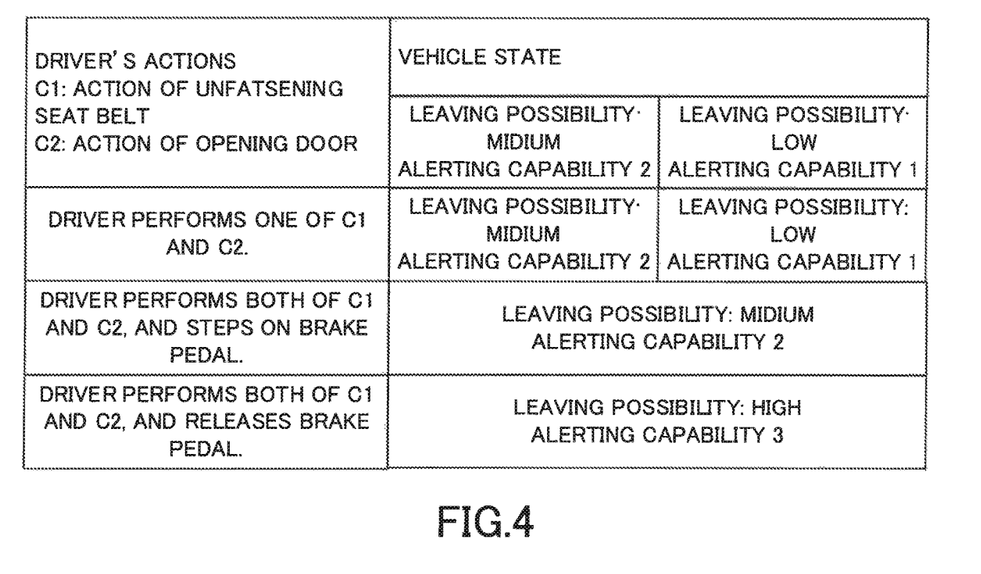
FIG. 4 is a view for illustrating a relationship among driver's acts, vehicle states, and alert capabilities.

An outline of operation of the present support apparatus 10 will next be described with reference to FIG. 4.

In the case where the shift range is not at the parking range "P" while the present support apparatus 10 is executing the automatic parking control, the present support apparatus 10 generates an alert for prompting the driver to switch the shift position SP to a position corresponding to the parking range "P" when the driver performs at least one of the following behaviors (leaving actions) C1 and C2.

C1: An action of the driver to have unfastened the driver seat belt

C2: An action of the driver to have opened the driver door

The present support apparatus 10 can generate three kinds of alerts that have three different alerting capabilities (drawing attention capabilities) 1 to 3. The alert capability is a capability to draw the driver's attention. The alerting capability 1 is the lowest among the alerting capabilities 1 to 3, and the alerting capability 3 is the highest among the alerting capabilities 1 to 3. Patterns of the alerts having the respective alerting capabilities 1 to 3 will be described later.

The present support apparatus 10 generates the alert having the alerting capability 1 or the alerting capability 2, depending on whether or not the vehicle VA has already reached the target parking area PAt, when the driver performs one of the leaving actions C1 and C2. More specifically, the present support apparatus 10 determines that a leaving possibility that the driver gets out of (leaves) the vehicle VA is "medium" to generate the alert having the alerting capability 2, when the vehicle VA has already reached the target parking area PAt. The present support apparatus 10 determines that the leaving possibility is "low" to generate the alert having the alerting capability 1, when the vehicle VA has not reached the target parking area PAt yet. The alert that is generated when the vehicle VA has already reached the target parking area PAt may be referred to as a "reached alert", a "post-parking alert", or a "first alert". The alert that is generated when the vehicle VA has not reached the target parking area PAt yet may be referred to as an "unreached alert", a "pre-parking alert", or a "second alert".

When the driver performs the leaving action C1 before the vehicle VA reaches the target parking area PA, it is likely that the driver has unfastened the driver seat belt in order to turn around to watch/look at the rear area of the vehicle VA while remaining in the driving seat. When the driver performs the leaving action C2 before the vehicle VA reaches the target parking area PAt, it is likely that the driver has opened the door of the driving seat in order to watch/look at the side area and/or the rear area of the vehicle while remaining in the driving seat.

If the alert having the high alerting capability is generated when the driver performs one of the leaving actions C1 and C2 without the driver's intention that the driver gets out of the vehicle VA, a possibility that the alert annoys the driver is high. In view of this, even if the driver performs one of the leaving actions C1 and C2, the present support apparatus 10 generates the alert having the alert capability 1 when the vehicle VA has not reached the target parking area PAt yet. A situation where the driver performs one of the leaving actions C1 and C2 before the vehicle VA reaches the target parking area PAt is referred to as a "situation 1".

In contrast, after the vehicle VA has already reached the target parking area PAt, the driver needs not to unfasten the driver seat belt and/or open the driver door in order to check the surrounding state around the vehicle VA during the automatic parking control or to watch/look at the side area and/or the rear area while remaining in the driving seat. Therefore, the leaving possibility that the driver has an intention to get out of (leave) the vehicle VA when the driver performs one of the leaving actions C1 and C2 after the vehicle VA reached the target parking area PAt is higher than the leaving possibility in the situation 1. Accordingly, in this case, the present support apparatus 10 generates the alert having the alerting capability 2.

The leaving possibility that the driver gets out of the vehicle VA when the driver performs both of the leaving actions C1 and C2 is higher than the leaving possibility in the situation 1. In this case, the present support apparatus 10 generates an alert having an alerting capability equal to or higher than the alerting capability 2.

More specifically, the present support apparatus 10 generates the alert having the alerting capability 3 when the driver performs a leaving action C3 referred to as a quasi leaving action after the driver has performed both of the leaving actions C1 and C2. The quasi leaving action C3 is an action of the driver to release the brake pedal 42. The present support apparatus 10 generates the alert having the alerting capability 2 when the driver does not perform the quasi leaving action C3 (in other words, when the driver continues stepping on the brake pedal 42) after the driver has performed both of the leaving actions C1 and C2. The leaving possibility that the driver gets out of the vehicle VA when the driver has performed all of the leaving actions C1 and C2 and the quasi leaving action C3 is very high. It should be noted that the leaving possibility that the driver gets out of the vehicle VA when the driver has performed only the quasi leaving action C3 is lower than the leaving possibility that the driver gets out of the vehicle VA when the driver has performed only one of the leaving actions C1 and C2.

(Specific Operation)

Figure 5:
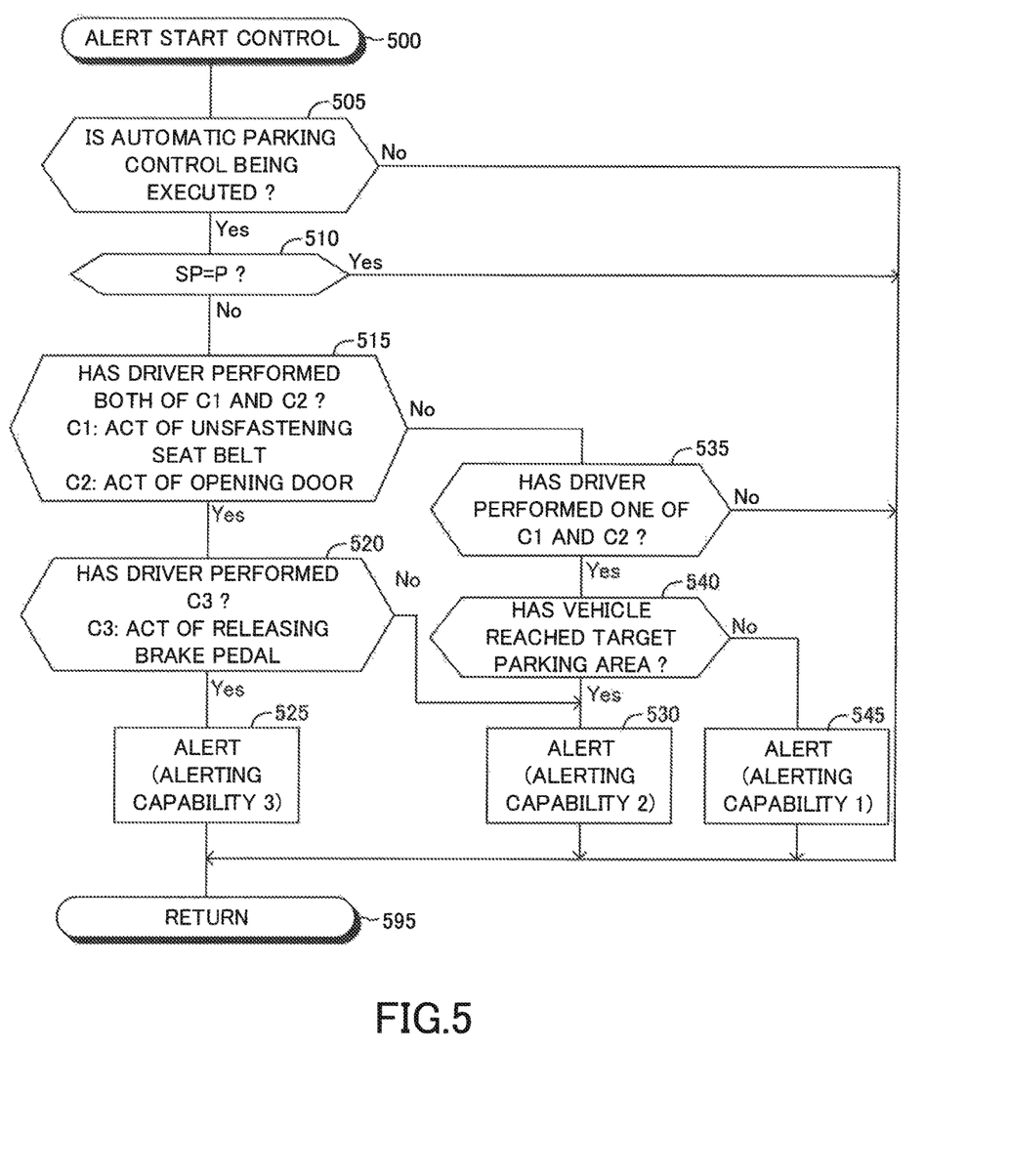
FIG. 5 is a flowchart showing a routine executed by a CPU of a parking support ECU shown in FIG. 1.

The CPU of the PSECU 20 is configured to execute a routine (an alert start control routine) shown by a flowchart in FIG. 5 every time a predetermined time elapses. Hereinafter, the CPU means the CPU of the PSECU 20, unless otherwise noted.

When an appropriate time point comes, the CPU starts processing from step 500 shown in FIG. 5, and proceeds to step 505 so as to determine whether or not the automatic parking control is being executed. If the automatic parking control is being executed, the CPU makes a "Yes" determination at Step 505, and proceeds to Step 510 so as to determine whether or not the shift range is at the parking range "P".

If the shift range is not at the parking range "P", the CPU makes a "No" determination at Step 510, and proceeds to Step 515. At Step 515, the CPU determines whether or not the driver has performed both of the leaving actions C1 and C2. More specifically, the CPU determines whether or not the driver has performed the leaving action C1 based on the detection signal from the driver seat belt sensor 25. Furthermore, the CPU determines whether or not the driver has performed the leaving action C2 based on the detection signal from the driver door sensor 26.

If the driver has performed both of the leaving actions C1 and C2, the CPU makes a "Yes" determination at Step 515, and proceeds to Step 520 so as to determine whether or not the driver has performed the quasi leaving action C3. More specifically, the CPU acquires, from the brake ECU 40, the brake pedal operation amount BP detected by the brake pedal operation amount sensor 41, and determines whether or not the brake pedal operation amount BP is "0". If the brake pedal operation amount BP is "0", the CPU determines that the driver has performed the quasi leaving action C3. Whereas, if the brake pedal operation amount BP is not "0", the CPU determines that the driver has not performed the quasi leaving action C3.

If the driver has performed the quasi leaving action C3, the CPU makes a "Yes" determination at Step 520, and proceeds to Step 525 so as to generate the alert having the alerting capability 3. Thereafter, the CPU proceeds to step 595 so as to end the present routine tentatively. Whereas, if the driver has not performed the quasi leaving action C3, the CPU makes a "No" determination at Step 520, and proceeds to Step 530 so as to generate the alert having the alerting capability 2. Thereafter, the CPU proceeds to step 595 so as to end the present routine tentatively.

If the driver has not performed at least any one of the leaving actions C1 and C2 (in other words, if the driver has performed only one of the leaving actions C1 and C2, or if the driver has performed none of the leaving actions C1 and C2) when the CPU proceeds to Step 515, the CPU makes a "No" determination at Step 515, and proceeds to Step 535. At Step 535, the CPU determines whether or not the driver has performed one of the leaving actions C1 and C2. If the driver has performed one of the leaving actions C1 and C2, the CPU makes a "Yes" determination at Step 535, and proceeds to Step 540.

At Step 540, the CPU determines whether or not the vehicle VA has already reached the target parking area PAt. If the vehicle has already reached the target parking area PAt, the CPU makes a "Yes" determination at Step 540, and proceeds to Step 530 so as to generate the alert having the alerting capability 2. Thereafter, the CPU proceeds to step 595 so as to end the present routine tentatively. Whereas, if the vehicle has not reached the target parking area PAt yet, the CPU makes a "No" determination at Step 540, and proceeds to Step 545 so as to generate the alert having the alerting capability 1. Thereafter, the CPU proceeds to step 595 so as to end the present routine tentatively.

If the driver has performed none of the leaving actions C1 and C2 when the CPU proceeds to Step 535, the CPU makes a "No" determination at Step 535, and proceeds to Step 595 so as to end the present routine tentatively. In this case, the CPU needs not to generate any alert, because the driver has not performed any of the leaving actions C1 and C2. Therefore, the CPU does not generate any alerts.

If the automatic parking control is not being executed when the CPU proceeds to Step 505, the CPU makes a "No" determination at Step 505, and proceeds to Step 595 so as to end the present routine tentatively.

If the shift range is at the parking range "P" when the CPU proceeds to Step 510, the CPU makes a "Yes" determination at Step 510, and proceeds to Step 595 so as to end the present routine tentatively.

Figure 6:
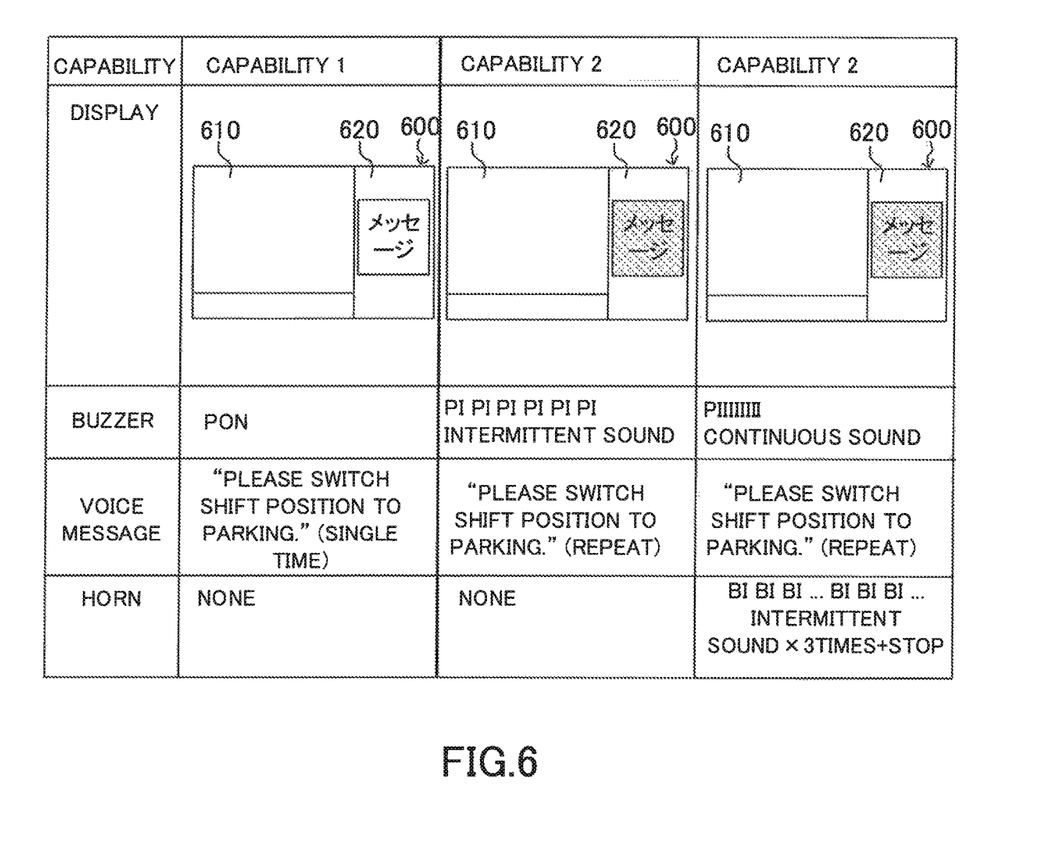
FIG. 6 is a view for illustrating alert patterns of the alert capabilities.

The alerts having the alerting capabilities 1 to 3 will next be described with reference to FIG. 6. The present support apparatus 10 generates the alerts using the touch panel 71, the buzzer 75, the speaker 72, and the horn 80. While the automatic parking control is being executed, an automatic parking support screen 600 (referring to FIG. 6) is being displayed on the touch panel 71. The automatic parking support screen 600 includes a forward direction monitoring/confirmation screen 610 and a bird's eye view screen 620. An image that is displayed on the forward direction monitoring screen 610 is generated by cutting out three dimensional image data formed by synthesized image data obtained by synthesizing the image data from each of the camera sensors 21A to 21D. The image displayed on the forward direction monitoring screen 610 corresponds to a view of a forward/moving direction area of the vehicle VA. An image that is displayed on the bird's eye view screen 620 is generated by cutting out the three dimensional image data, and corresponds to a view of surroundings of the vehicle VA from a bird's-eye point that is positioned immediately above the vehicle VA. <Alerting capability 1>

Touch panel 71: A message that "Please switch the shift range to the parking range "P"" is displayed on top on the bird's eye view screen 620. Background color of a window on which the message is displayed is white.

Buzzer 75: A single sound ("PON") is generated from the buzzer 75.

Speaker 72: A voice message that "Please switch the shift range to the parking range "P"" is generated from the speaker 72 just once.

Horn 80: No alert sound is generated from the horn 80.

<Alerting capability 2>

Touch panel 71: The same message as above is displayed on the bird's eye view screen 620, however, the background color of the window on which the message is displayed is red.

Buzzer 75: An intermittent sound (a discontinuous sound) having the following sound pattern is generated from the buzzer 75. It sounds like "Pi-(break)-Pi-(break)-Pi-(break)-Pi-(break)-Pi-(break)-Pi")

An alert sound (a continuous beep sounding like "Pi") starts to be generated from the buzzer 75, and the alert sound is stopped when a predetermined first time elapses from a time point at which the alert sound starts to be generated. When a predetermined second time elapses from a time point at which the alert sound stops, the alert sound (the continuous beep) starts to be generated again. Namely, the continuous beep is generated for the first time at the interval of the second time. It should be noted that the detail of the above sound pattern is disclosed in, for example, Japanese Patent Application Laid-Open (kokai) No. 2019-32744.

Speaker 72: The same voice message as above is generated from the speaker 72 repeatedly.

Horn 80: No alert sound is generated from the horn 80.

The alert having the alerting capability 2 is different from the alert having the alerting capability 1 in the following points. In other words, the alerting capability 2 is higher than the alerting capability 1 owing to the following points.

The background color of the window is red.

The intermittent sound is generated from the buzzer 75.

The voice message is generated from the speaker 72 repeatedly.

<Alerting capability 3>

Touch panel 71: The same screen as that of the alert having the alerting capability 2 is displayed on the touch panel 71.

Buzzer 75: A continuous sound ("Piiiiiiii") is generated from the buzzer 75. Namely, the alert sound continues to be generated without stopping.

Speaker 72: The same voice message as above is generated from the speaker 72 repeatedly, similarly to the alert having the alerting capability 2.

Horn 80: A set of the intermittent sound (like "Pi-(break)-Pi-(break)-Pi-(break)-Pi-(break)-Pi-(break)-Pi") that has a pattern similar to the generated from the buzzer 75 in the alert having the alerting capability 2 is repeated three times. Thereafter, no alert sound is generated for a predetermined time length. Then, the one set of the intermittent sound is generated, and thereafter, the pause having the predetermined time length is provided. This patterns is repeated.

The alert having the alerting capability 3 is different from the alert having the alerting capability 2 in the following points. In other words, the alerting capability 3 is higher than the alerting capability 2 owing to the following points.

The continuous sound is generated from the buzzer 75.

The alert sound is generated from the horn 80.

An alert end control routine will next be described with reference to FIG. 7.

Figure 7:
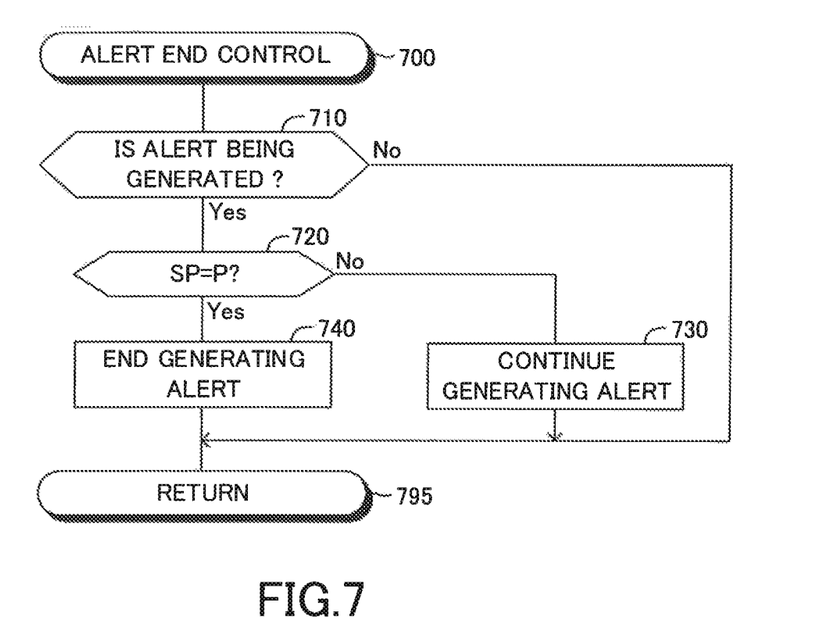
FIG. 7 is a flowchart showing a routine executed by the CPU of the parking support ECU shown in FIG. 1.

The CPU is configured to execute the alert end control routine shown by a flowchart in FIG. 7 every time a predetermined time elapses.

When an appropriate time point comes, the CPU starts processing from step 700 shown in FIG. 7, and proceeds to step 710 so as to determine whether or not the alert (having in any capability) is being generated. If the alert is being generated, the CPU makes a "Yes" determination at Step 710, and proceeds to Step 720 so as to determine whether or not the shift range is at the parking range "P".

If the shift range is not at the parking range "P", the CPU makes a "No" determination at Step 720, and proceeds to Step 730 so as to continue generating the alert. Thereafter, the CPU proceeds to step 795 so as to end the present routine tentatively.

Whereas, if the shift range is at the parking range "P", the CPU makes a "Yes" determination at Step 720, and proceeds to Step 740 so as to end generating the alert. Thereafter, the CPU proceeds to step 795 so as to end the present routine tentatively.

If the alert is not being generated when the CPU proceeds to Step 710, the CPU makes a "No" determination at Step 710, and proceeds to Step 795 so as to end the present routine tentatively.

As described above, in the case where the shift range is not at the parking range while the automatic parking control is being executed, if the driver has performed either one of the leaving actions C1 and C2, the present support apparatus 10:

generates the alert (the reached alert) having the first alerting capability when the vehicle VA has already reached the target parking area; and generates the alert (the unreached alert) having the second alerting capability lower than the first alerting capability when the vehicle VA has not reached the target parking area yet.

Therefore, when the driver has performed either one of the leaving actions C1 and C2 without the intention to get out of (or leave) the vehicle VA, the alert having an appropriate alerting capability is issued so that the possibility that the alert annoys the driver can be reduced.

The present disclosure is not limited to the above embodiment, and may employ various modifications within the scope of the present disclosure.

For instance, the present support apparatus 10 may further comprise a seat sensor configured to detect whether or not the driver sits in the driver seat. The thus configured apparatus 10 may be configured to determine whether or not the vehicle VA has already reached the target parking area PAt when the seat sensor is detecting that the driver does not sit in the driver seat, in the case where the shift range is not at the parking range while the automatic parking control is being executed. Then, the thus configured present support apparatus 10 generates the alert having the alerting capability 2 when it is determined that the vehicle VA has already reached the target parking area PAt, and generates the alert having the alerting capability 1 when it is determined that the vehicle VA has not reached the target parking area PAt yet.

The seat sensor may be replaced with a driver monitoring camera sensor. The driver monitoring camera sensor obtains image data by photographing a scene having the center at (i.e., around) the driver seat. In the case where the shift range is not at the parking range while the automatic parking control is being executed, the modified present support apparatus 10 having the driver monitoring camera sensor may be configured to determine whether or not the vehicle VA has already reached the target parking area PAt when the modified present support apparatus 10 determines that the driver does not sit in the driver seat based on the image data obtained by the driver monitoring camera sensor.

Furthermore, one of the above two modified support apparatus (hereinafter, simply referred to as a "third modified apparatus") may be configured to determine whether or not the driver has opened the driver seat door, when it is determined that the vehicle VA has already reached the target parking area PAt in the case where it is determined that the driver is not sitting in the driver seat using the seat sensor or the driver monitoring camera sensor. Then, the third modified apparatus may generate the alert having the alerting capability 3 when it is determined that the driver has opened the driver seat door, and may generate the alert having the alerting capability 2 when it is determined that the driver has not opened the driver seat door.

It is further noted that, when the CPU makes a "No" determination at Step 540 shown in FIG. 5, in other words, when the vehicle VA has not reached the target parking area PAt yet, the CPU may directly proceed to Step 595 without proceeding to Step 545 so as not to generate any alerts.

In the example shown in FIG. 3, the driver designates, as the target parking area PAt, the parking area PA to (at) which the vehicle VA is to be parked through the perpendicular parking. However, the driver can designate, as the target parking area PAt, the parking area PA to (at) which the vehicle VA is to be parked through parallel parking. In the parallel parking, the front-rear direction of the vehicle VA observed when the automatic parking control is finished is parallel with the front-rear direction of the vehicle VA observed when the automatic parking control is started.

The present disclosure can be applied to the support apparatus 10 that can search for and designate the target parking area PAt that the driver has registered (stored) in advance.

The present support apparatus 10 controls all of the acceleration, the deceleration, and the steered angle of the vehicle VA automatically through the above described automatic parking control. The present support apparatus 10 may control the steered angle of the vehicle VA automatically through the automatic parking control. In that case, the acceleration, and the deceleration of the vehicle is controlled by the driver. For instance, the driver operates only the brake pedal and the engine continues generating the creeping torque while the automatic parking control is executed. In this case, the driver just needs to operate the brake pedal only to automatically park the vehicle VA to the target parking area PAt. More specifically, the driver releases the brake pedal to move the vehicle VA, and presses the brake pedal to stop the vehicle VA or to decrease the vehicle speed, while the automatic parking control is executed, until the vehicle reference point Pb reaches the target reference point Pbt of the target parking area PAt. When the vehicle reference point Pb has reached the target reference point Pbt, the brake force is automatically generated to stop the vehicle VA.

The present embodiments may be applied to a hybrid vehicle and an electric vehicle.

If a stereo camera device configured to measure a distance between the stereo camera device and the object is adopted as the camera sensors 21, the present support apparatus 10 needs not to comprise the clearance sonars.

The clearance sonars may be replaced with any types of sensors, as long as each of them is configured to radiate a radio wave (e.g., an infrared ray, and radar wave) and to receive a reflected radio wave so as to detect an object and measure a distance between the object and the vehicle VA. Namely, the clearance sonars may be replaced with the infrared ray radar sensors and/or millimeter wave band radar sensors. Alternatively, the infrared ray radar sensors and/or millimeter wave band radar sensors may be employed in addition to the clearance sonars.

The number of the camera sensors 21 and the number of the clearance sonars are not limited those figures described in FIG. 2.

What is claimed is:

1. A parking support apparatus comprising:
a range shifter for shifting to one of a forward range, reverse range, neutral range and a parking range;
a shift range detection sensor configured to detect a current shift range;
an alert output device configured to generate an alert for drawing attention of a driver of a vehicle; and
a controller configured to execute an automatic parking control for having the vehicle move into a target parking area that the driver designates,
wherein,
the controller is configured to:
determine whether or not a leaving condition becomes satisfied while the controller is executing the automatic parking control and the current shift range is at a range other than the parking range, the leaving condition being a condition that is satisfied when the driver performs a leaving action that the driver needs to perform in order to get out of the vehicle;
determine whether or not the vehicle has already reached the target parking area;
generate, from the alert output device, a first alert having a first alerting capability, if it is determined that the vehicle has already reached the target parking area when it is determined that the leaving condition has been satisfied; and
generate, from the alert output device, a second alert having a second alerting capability or no alert, if it is determined that the vehicle has not reached the target parking area yet when it is determined that the leaving condition has been satisfied, the second alerting capability being lower than the first alerting capability in terms of ability to draw attention of the driver.

2. The parking support apparatus according to claim 1, wherein the controller is configured to determine that the leaving condition becomes satisfied when the driver performs one of a first leaving action and a second leaving action, and to determine whether or not the vehicle has already reached the target parking area when the leaving condition is determined to become satisfied.

3. The parking support apparatus according to claim 2, wherein the controller is configured to generate, from the alert output device, an alert having a third alerting capability regardless of whether or not the vehicle has already reached the target parking area, when it is determined that the driver has performed both of the first leaving action and the second leaving action, the third alerting capability being equal to or higher than the first alerting capability in terms of ability to draw attention of the driver.

4. The parking support apparatus according to claim 3, wherein the controller is configured to:
determine whether or not the driver has performed a quasi leaving action, wherein a possibility that the driver gets out of the vehicle when the driver has performed the quasi leaving action is lower than a possibility that the driver gets out of the vehicle when the driver has performed both of the first leaving action and the second leaving action;

generate, from the alert output device, an alert having an alerting capability higher than the first alerting capability in terms of ability to draw attention of the driver, when it is determined that the driver has performed the quasi leaving action in a case where the driver has performed both of the first leaving action and the second leaving action; and generate, from the alert output device, an alert having an alerting capability equal to the first alerting capability in terms of ability to draw attention of the driver, when it is determined that the driver has not performed the quasi leaving action in the case where the driver has performed both of the first leaving action and the second leaving action.

* * * * *